United States Patent Office 3,423,668
Patented Jan. 21, 1969

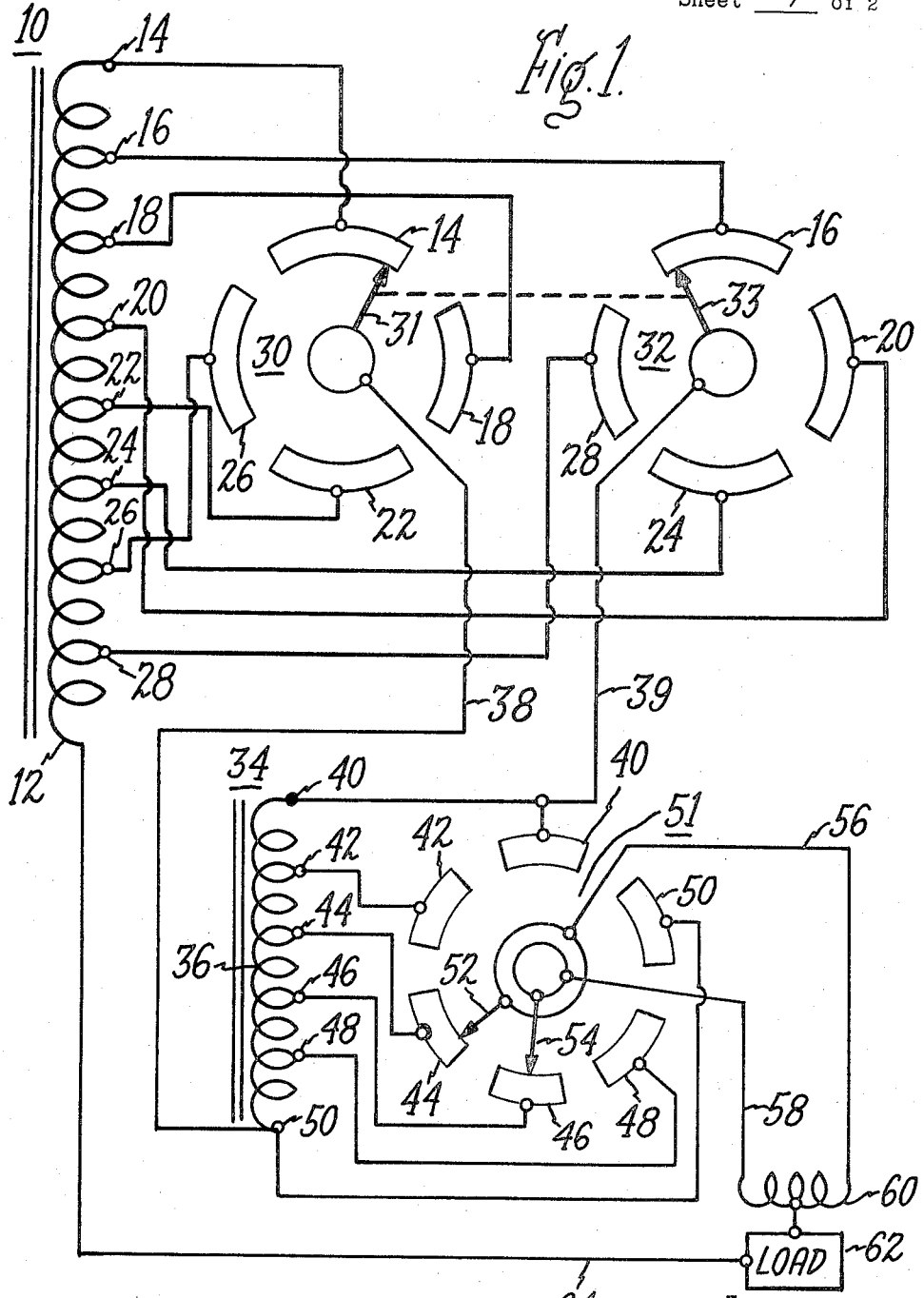

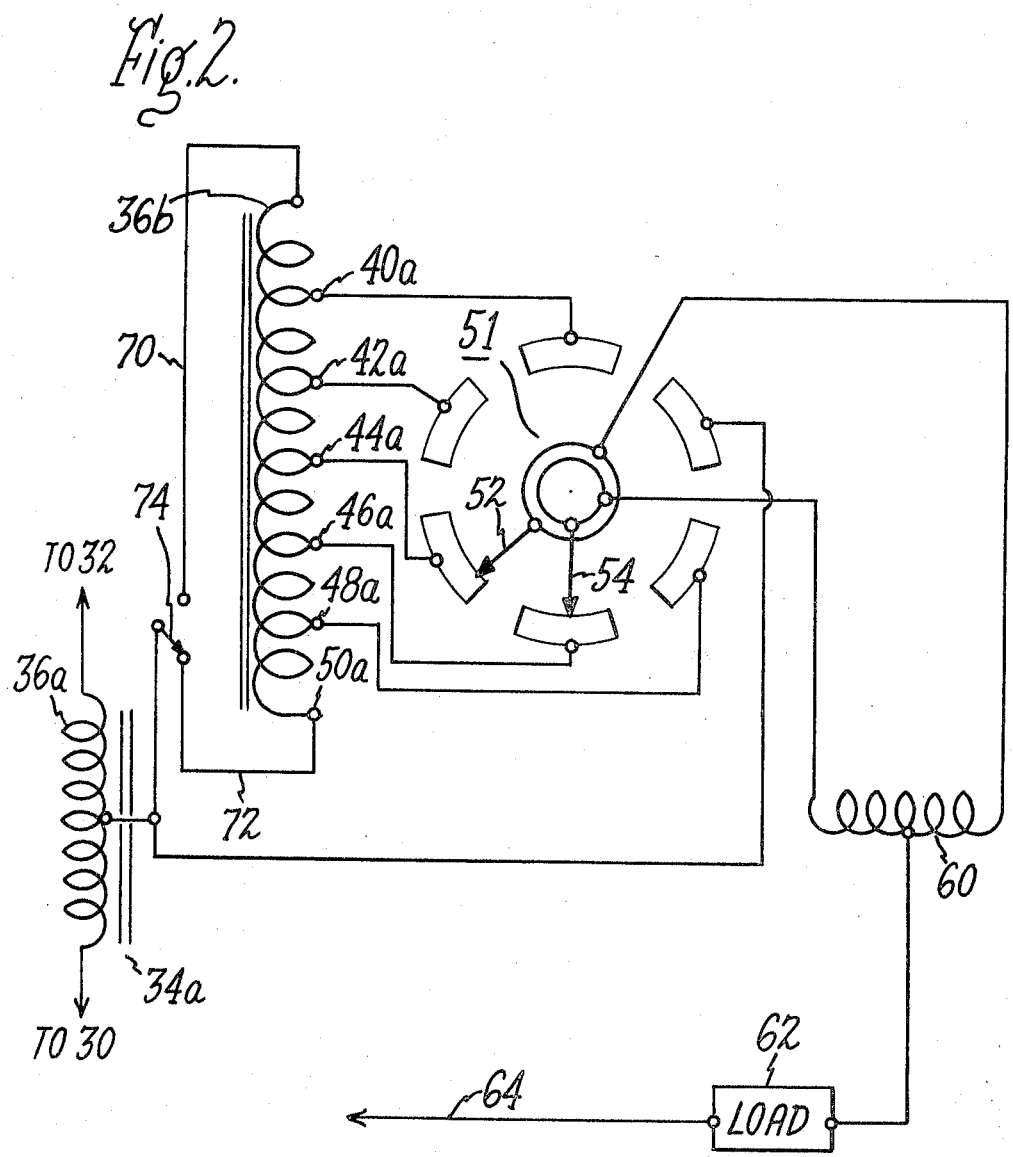

3,423,668
VOLTAGE REGULATOR VERNIER CONTROL DEVICE WHEREIN AN AUTOTRANSFORMER IS DIRECTLY CONNECTED TO THE CONTROL FINGERS OF A COARSE CONTROL
Robert H. Brennan, Pittsfield, Mass., assignor to General Electric Company, a corporation of New York
Filed May 19, 1966, Ser. No. 551,293
U.S. Cl. 323—43.5                4 Claims
Int. Cl. H02m 5/12

ABSTRACT OF THE DISCLOSURE

A vernier control device for use with the coarse control of a voltage regulator. The coarse control comprises a tap changer with a pair of rotatable contact fingers connected to a pair of circularly tapped contacts of the voltage regulator such that each contact finger will only make contact with alternate ones of the tap contacts. The vernier control is in the form of a tapped autotransformer directly connected between the rotatable contact fingers of the coarse control. The vernier control has a pair of rotatable contact fingers which may contact the same contact member of the tapped autotransformer or bridge a pair of adjacent contacts. The load to be regulated is connected to the rotatable fingers of the vernier control and to one end of the coarse control winding.

---

This invention relates to voltage regulators and more particularly to a vernier control device for voltage regulators.

As is well understood by those skilled in the voltage regulator art, voltage regulators are used both to maintain voltages at predetermined levels and also to provide regulated voltages to various types of equipment in which the voltages may be varied over a wide range. In the latter case, such as in process equipment, it is often desirable to be able to apply the voltage in very small regulated increments. At other times it is desirable to rapidly change the applied voltages to higher or lower values. To perform such functions requires voltage regulators which have means for applying varying voltages over large increments, usually by means of a step regulator winding. Further, such regulators will have a fine vernier control which will provide a plurality of incremental voltage variations within the range of each step of the step regulator winding. Obviously, the vernier adjustment may be another stepped winding or it may be an induction regulator. As will be understood, it is desirable to provide a coarse control device to provide for large voltage changes by means of the step regulator winding. It is also desirable to provide means for operating a coarse control device over the step regulator winding while the various contacts are at zero load current to prevent arcing of the contacts. As is understood, this normally requires that the vernier voltage control be operated through its steps to provide a zero load current on the various contacts of the coarse control device prior to the operation of the coarse control device. Many types of vernier control devices have been provided which may be used to provide the vernier control of a voltage regulator. However, these have been provided with a number of problems, such as undue complications and undue expense of the equipment. As will be understood it is desirable to provide voltage regulators as economically as possible, utilizing simple mechanisms that will require relatively little maintenance.

It is therefore one object of this invention to provide a novel voltage regulator having both coarse and fine voltage control utilizing relatively simple contact and control mechanisms.

A further object of this invention is to provide a novel vernier control device for voltage regulators.

A still further object of this invention is to provide a vernier control device for a voltage regulator having a stepped winding in which the vernier control device is connected directly to the switch contacts of the coarse control device.

In carrying out this invention in one form, a voltage regulator is provided having a winding with a plurality of tap sections for varying the voltage provided by the voltage regulator. Tap contacts are provided for the various tap sections. A coarse control device in the form of a tap changer having a pair of rotatable contact fingers is provided and connected in the voltage regulator such that each contact finger will only make electrical contact with alternate ones of the tap contacts. A vernier control is provided in the form of a tapped autotransformer directly connected to the rotatable fingers of the coarse control device. A load which is desired to be regulated is connected to the rotatable fingers of the vernier control regulator.

The invention which is sought to be protected will be clearly pointed out and distinctly claimed in the claims appended hereto. However, it is believed that this invention and the manner in which its various objects and advantages are obtained, as well as other objects and advantages thereof, will be better understood from the following detailed description of preferred embodiments especially when considered in the light of the accompanying drawing, in which:

FIGURE 1 is a schematic circuit diagram of a voltage regulator showing one form of coarse control device in conjunction with a novel form of vernier voltage control device according to this invention; and FIGURE 2 is a schematic circuit diagram of an alternate form of vernier control device according to this invention.

The voltage regulator of this invention provides an improved form of vernier control device. The improved vernier control device will find application in many types of voltage regulators. It is particularly suited for use in the voltage regulator disclosed in application Ser. No. 545,949, filed Apr. 28, 1966, for Voltage Regulator Coarse Control Device in the names of C. W. Schoendube and R. A. Prior and which is assigned to the same assignee as this invention.

The description of this invention will now proceed with particular reference to the drawing wherein like numerals are used to indicate like parts throughout the various views. Considering first FIGURE 1, a preferred embodiment of a voltage regulator is shown with a coarse control device as described and claimed in the aforementioned application Ser. No. 545,949. The coarse control device is shown in conjunction with a transformer 10 having a tapped or stepped winding 12. The winding 12 is shown as divided into eight equal tap sections by the taps labeled 14, 16, 18, 20, 22, 24, 26 and 28. Each tap is connected to alternate ones of the circularly arranged contact members, also labeled 14 through 28. As can be seen from FIGURE 1, a pair of circularly arranged switching devices or contact devices 30 and 32 are provided. Contact device 30 has a contact finger 31 movable between the four contact members 14, 18, 22 and 26. The circular contact device 32 is provided with a movable contact finger 33 which may be movable between contacts 16, 20, 24 and 28. Of course, it will be understood that each of the contact members 14 through 28 is connected to the same numbered tap and, as can be seen, the contact sections are alternated between the contact device 30 and contact device 32. It will be understood that each of contacts 14 through 28, the spaces therebetween, and rotatable fingers 31 and 33 are designed in such a manner that one finger will always be in electrical contact with one of the contact members. As is indicated by the dotted line in FIG. 1, movable fingers 31 and 33 are connected to rotate in unison. This may be provided by a side-by-side mounting, as indicated, or the control devices 30 and 32 may be mounted on the same rotatable shaft as is more fully discussed in the previously mentioned application Ser. No. 545,949.

As shown in FIG. 1, a novel vernier control device is provided, in the form of autotransformer 34, having a tap winding 36. The opposite ends of tap winding 36 are directly connected to movable fingers 31 and 33 through leads 38 and 39, respectively. Thus autotransformer 34 will be energized by the potential between fingers 31 and 33. In the illustration shown in FIG. 1, the potential between taps 14 and 16 of winding 12 is directly connected to tap winding 36.

As can be seen winding 36 is divided into a plurality of equal tap sections, five being shown in FIG. 1. The taps of the tap winding 36 are numbered 40, 42, 44, 46, 48 and 50. Each tap is connected to the same numbered contact of a switching or contact device 51. Switching device 51 includes movable fingers 52, 54 which are connected and operated such that they may make electrical connection with any single contact or may bridge any pair of adjacent contacts. Contact fingers 52, 54 move in unison such that an electrical connection is always established between one of the fingers and one of the contacts. In FIG. 1 fingers 52, 54 are shown in bridging contact with the contacts 44, 46, respectively. A pair of leads 56, 58, respectively, are connected to fingers 52 and 54 and are also connected to a center tapped current limiting reactor 60. This of course connects the reactor 60 across the fingers 52 and 54. A load 62 is connected to the center tap of reactor 60 and to one end of winding 12 by the lead 64.

The operation of the voltage regulator of FIG. 1 will now be described. With fingers 31 and 33 bridging the tap section between taps 14 and 16, as shown, the potential between these taps will appear across the step winding 36. It will be apparent from FIG. 1 that tap 40 of winding 36 will be at the potential of tap 16, while tap 50 will be at the potential of tap 14. Obviously, the positioning of the fingers 52 and 54 along the taps 40 through 50 will increase or decrease the voltage at the center tap of reactor 60 in small increments from that of tap 14 to that of tap 16. Assuming that the voltage across the winding 12 decreases from tap 14 to tap 28 then the voltage will be decreased from contact 14 to that of contact 16 by moving the tap fingers 52, 54 from tap 50 through to tap 40. When both fingers are on tap 40 all of the load current will flow from tap 16 through finger 33, lead 39, contact 40 and then fingers 52, 54 and leads 56, 58 to the center tap of reactor 60. Fingers 31 and 33 may now be moved with finger 33 sweeping across contact 16, while finger 31 moves from contact 14 to contact 18. This may be done without any substantial arcing of the contacts since only the excitation currents of the vernier autotransformer 34 and reactor 60 are flowing in finger 31.

When finger 31 makes electrical contact with contact 18 the polarity of the applied voltage reverses in the winding 36. Now, the voltage applied to the mid tap of reactor 60 may be decreased from the potential of tap 16 to that of tap 18 by reversing the movement of fingers 52, 54. Fingers 52, 54 will then move from tap 40 through 42, 44, 46 and 48 to tap 50, reducing the voltage applied to the load 62 in small increments. This action may be continued through all of the taps on the winding 12. Obviously to increase the voltage, the fingers will be rotated in the opposite direction on both the winding 36 and the winding 12.

From the above it will be apparent that by use of a single autotransformer directly connected to the contact fingers of the coarse voltage regulator a fine vernier control may be provided without the need of a current limiting reactor between the fingers and the autotransformer, as is found in the prior art, such as for example application Ser. No. 545,949. As can be seen, the autotransformer winding 36 is excited by the potential placed across it by means of the taps of the coarse regulator. Thus the vernier autotransformer can be designed, as necessary for the particular application. In many prior art devices the vernier winding is wound on the main core of the voltage regulator, which limits freedom of design. It will also be apparent that the k.v.a. capacity of the autotransformer is much less than the capacity needed for the vernier control disclosed in application Ser. No. 545,949. In the embodiment disclosed in FIGURE 1, the k.v.a. capacity is half that required in application Ser. No. 545,949.

If desired the tap section of the autotransformer 34 may be decreased by use of a center tap primary section of an autotransformer in the manner particularly disclosed in FIGURE 2 of the drawing. FIGURE 2 of the drawing merely shows the vernier connections and autotransformer. As is shown in FIG. 2, a vernier autotransformer is provided with a primary 36a and a stepped secondary 36b. Primary 36a of the vernier transformer 34a is connected directly across the switching contacts 30 and 32 of the coarse transformer, as is indicated by the arrowed lines designated as "to 30" and "to 32." The stepped portion of the autotransformer 34a is provided with a plurality of taps 40a, 42a, 44a, 46a, 48a and 50a. As can be seen from FIG. 2, taps 40a and 50a are connected by leads to a reversing switch 74 which is connected to the mid tap of the primary 36a of the vernier autotransformer 34a. In this manner, as will be understood, the stepped vernier autotransformer winding 36b only covers a half step between each of the tap sections of the main winding 12, that is, when the main contacts 30 and 32 are bridging tap 14 and tap 16 of transformer 12 (in FIG. 1) then the transformer 36b will provide an adding voltage from the voltage of contact 16 to the mid point between contacts 16 and 14. Switch 74 may then be reversed to obtain an additional vernier step between the mid point between contacts 16 and 14, up to the voltage of contact 14. Of course in a similar fashion this may be done by reversing the movement of contact switches 30, 32 and the vernier control to obtain a decrease in voltage steps.

Of course, it will be apparent that contact fingers 52 and 54 of the contact device 51 are mounted in the same manner as referred to in FIG. 1 to rotate across contacts 40a through 50a and are also connected to the center tap current limiting reactor 60 which in turn is connected to the load 62, while a lead 64 returns to the other side of the transformer 12. By use of the center tapped primary winding 36a and the reversing switch 74 it is possible to double the number of vernier steps possible through each tap section of the coarse winding 12 without increasing the number of taps on switch 51. It will be understood that the k.v.a. capacity of autotransformer 34a is greater than that of autotransformer 34. However, it will still be less than that required by the vernier control of application Ser. No. 545,949.

While there has been shown and described the present preferred embodiments of this invention it will of course be apparent to those skilled in the art that various changes may be made in some of the constructional details without departing from the spirit and scope of the invention, particularly as it is defined in the appended claims.

What is claimed as new and which it is desired to secure by Letters Patent of the United States is:

1. A voltage regulator having a varnier voltage control, said voltage regulator comprising:
(a) a first induction means, a winding on said first induction means divided into a plurality of equally spaced tap sections by a plurality of taps, (1) a pair of circularly arranged switch means having a plurality of contacts, each of said contacts being alternately connected to one of said plurality of taps on said tapped winding,
(2) said pair of switching means including a movable finger on each said switching means,
 (a) said movable fingers positioned to engage one of said plurality of circularly arranged contacts on each of said switching means, said movable fingers movable in unison such that at least one finger will always be in electrical contact with at least one contact,
the improvement which comprises,
 (b) an autotransformer having a stepped winding for use as a vernier control, said stepped winding having a plurality of taps,
 (1) a switching means, said switching means having a plurality of circularly arranged contacts with each of said contacts being connected to said winding at one of said plurality of taps,
 (a) said switching means including a pair of movable fingers, said movable fingers positioned to engage said plurality of circularly arranged contacts,
 (2) said autotransformer being connected directly to said pair of switching means of said first induction means.

2. A voltage regulator having a vernier voltage control as claimed in claim 1 in which said autotransformer is provided with a reversing switch to allow said switch to be continuously rotated in the same direction.

3. A voltage regulator having a vernier voltage control as claimed in claim 1 in which said autotransformer is provided with a primary portion connected directly across said pair of switching means, and a secondary portion, one end of said secondary portion connected to a mid tap on said primary portion by a reversing switch.

4. A voltage regulator having a vernier voltage control as claimed in claim 1 in which said autotransformer is a continuous winding having one end connected to one said movable finger of one of said pair of circularly arranged switching means and the opposite end connected to the other said movable finger on the other of said pair of circularly arranged switching means whereby the polarity of said autotransformer reverses when said pair of circularly arranged contacts move from one of said plurality of contacts to another of said plurality of contacts.

References Cited

UNITED STATES PATENTS

| | | | |
|---|---|---|---|
| 3,100,865 | 8/1963 | Nielsen | 323—43.5 |
| 3,122,698 | 2/1964 | Ladd | 323—43.5 |

JOHN F. COUCH, *Primary Examiner.*

G. GOLDBERG, *Assistant Examiner.*

U.S. Cl. X.R.

307—115, 132; 323—47, 91